US006434515B1

(12) United States Patent
Qian (10) Patent No.: US 6,434,515 B1
(45) Date of Patent: Aug. 13, 2002

(54) SIGNAL ANALYZER SYSTEM AND METHOD FOR COMPUTING A FAST GABOR SPECTROGRAM

(75) Inventor: Shie Qian, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/370,310

(22) Filed: Aug. 9, 1999

(51) Int. Cl.[7] ............................................. G06F 17/17
(52) U.S. Cl. ................................. 702/190; 324/76.12
(58) Field of Search ........................... 702/190, 66, 69, 702/70, 71, 73, 75, 76, 79, 77, 78, 106, 108, 110, 124, 125, 126, 183, 189, 193, 197, 198; 324/76.12, 76.15, 76.19, 76.21, 76.22, 76.24, 76.29, 38, 76.55, 76.61, 76.33, 76.16; 708/845, 819, 820, 821, 847, 815

(56) References Cited

U.S. PATENT DOCUMENTS

| 4,837,578 A | 6/1989 | Gammell |
| 4,894,795 A | 1/1990 | Whitehouse et al. |
| 5,046,504 A | 9/1991 | Albert et al. |
| 5,291,560 A | 3/1994 | Daugman |
| 5,353,233 A | 10/1994 | Qian et al. |

OTHER PUBLICATIONS

D. Gabor, "Theory of Communication", J.IEE (London), vol. 93, No. 111, Nov. 1946, pp. 429–457.
Qian, et al. "Wigner Distribution Decomposition and Cross–term Interference Cancellation", UMBC Technical Report No. EER–91–1, University of Maryland, Jan. 1991.
Wexler, et al., "Discrete Gabor Expansions", Signal Processing, vol. 21, No. 3, Nov. 1990, pp. 207–221.

International Search Report, Application No. PCT/US93/02499, Mailed May 12, 1993.

Primary Examiner—Marc S. Hoff
Assistant Examiner—Edward Raymond
(74) Attorney, Agent, or Firm—Conley, Rose & Tayon PC; Jeffrey C. Hood (57) ABSTRACT

A signal analyzer, method and memory medium for generating a time varying spectrum for input signals characterized by frequency components which change in time. The signal analyzer includes a source of a sequence of digital signals representative of an input signal, a processor coupled to the source, and a memory medium coupled to the processor. The memory medium stores a software program which is executable by the processor to compute the time-varying spectrum of the input signal. When the processor executes the software program, the processor is operable to first compute a Gabor transform (that is, a sampled short-time Fourier transform) of the digital signals to produce Gabor coefficients. The processor then computes a two dimensional auto-correlation of the Gabor coefficients to produce auto-correlation results. The auto-correlation results are then applied to a 2-dimensional fast interpolation filter to produce the time-varying spectrum, wherein the time-varying spectrum is a Gabor spectrogram. The signal analyzer may repeat the above steps n+1 times, based on the order determined by a user, and sum the results for an n order time-varying spectrum. The process more may then operate to process and/or display the time-varying spectrum.

28 Claims, 5 Drawing Sheets

SIGNAL ANALYZER SYSTEM AND METHOD FOR COMPUTING A FAST GABOR SPECTROGRAM

COMPUTER PROGRAM APPENDIX

The present application includes a compact disc containing Appendix A, which is one example of a source code routine written in the C programming language for performing the Gabor spectrogam according to the present invention. The compact disc contains a single text file calle "Gabor Spectrogram". The compact disc is in the IBM-PC format and may be viewed with the Windows operating system. The source code listing in the file "Gabor Spectrogram" is called "Fast Gabor Spectrogram function, Gaborspectrogram.c", has a size of 74 kbytes, and a date of creation of Mar. 5, 1999. The source code listing on the compact disc filed in the application herewith is hereby incorporated by reference as though fully and completely set forth herein.

RESERVATION OF COPYRIGHT

A portion of the disclosure of this patent document, specifically Appendix A, contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to digital signal processing and joint time frequency analysis; and more particularly, to systems and methods for determining characteristics of signals having frequency components that vary in time.

2. Description of the Related Art

Due to physical limitations, systems (e.g., an engine, or the human body) or natural phenomena can generally only be studied through the signals (e.g., sound, temperature, heartbeat, and blood pressure) that are generated from or by the system under consideration. Therefore, signal analysis plays a fundamental role in our everyday life. By properly applying analysis techniques, a great deal of information can be obtained about systems without physically invasive procedures.

Most current signal analysis techniques characterize the signal in either the time domain or frequency domain. The time waveform, such as the sound of an engine or an electrocardiogram (ECG), illustrates how the signal's magnitude varies with time, and the frequency function, such as the power spectrum, indicates how often such changes take place. In most applications, the time and frequency behaviors of signals are closely related to each other. However, conventional techniques are designed to analyze them separately.

Prior art systems for analyzing signals with frequency components that vary in time have used the so-called short time Fourier transform STFT, also known as the windowed Fourier transform. This algorithm is based on a computationally intensive Fourier transform of a large number of short time windows of the input signal. Transforms of each of the short time windows are combined to generate a time varying spectrum of the input signal.

Commonly, the STFT-based spectrogram, described above, has been performed to map time domain (or frequency domain) signals into the joint time-frequency domain. The STFT is simple, but it suffers from the co-called windowing effect, i.e., the STFT is subject to the length of the analysis window function. A short window yields good time resolution, but poor frequency resolution, and vice versa. Particularly, the STFT-based spectrogram is not suitable for the instantaneous frequency estimation which is one of the most important signal's aspects of interest. The instantaneous frequency estimation from the STFT-based spectrogram is biased, which is subject to the window selection. Finally, the algorithm of the STFT-based spectrogram is not convenient to zoom in to the time-frequency region of interest.

Figure 1:
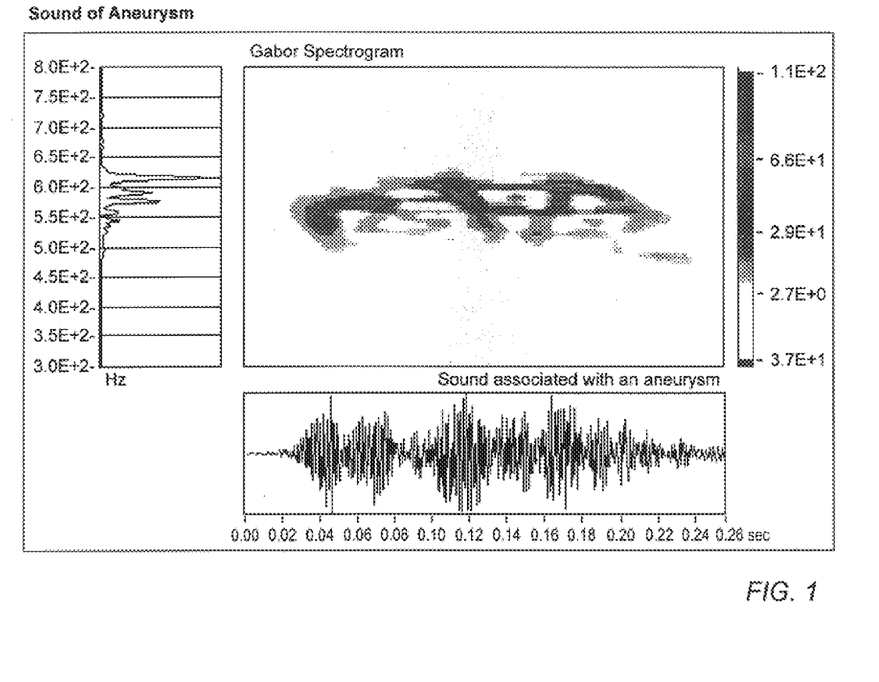
FIG. 1 illustrates time, frequency, and joint time-frequency (Gabor Spectrogram) plots of the sound associated with an aneurysm in the human body.

As an alternative, U.S. Pat. No. 5,353,233 to Qian, et al. titled "Method and Apparatus for Time Varying Spectrum Analysis" discloses a technique which may be referred to as a Gabor spectrogram. The Gabor spectrogram is a Gabor expansion based spectrogram. See, Qian, et al., "Discrete Gabor Transform", IEEE Trans. Signal Processing, Vol.41, No.7, July 1993, pp.2429–2439. Compared to the STFT-based spectrogram, the Gabor spectrogram has better time-frequency resolution and good zoom in capability. The Gabor spectrogram is extremely powerful when the high-resolution time-dependent spectrum is a must. FIG. 1 illustrates time, frequency, and joint time-frequency (Gabor Spectrogram) plots of the sound associated with an aneurysm in the human body. It has been determined that such sound is due to vibration stimulated by the blood flow inside the aneurysm and nearby blood vessels. The mechanism that emits such sounds is complicated and involves the wall, chamber, surrounding blood vessels, and moving blood, under varying pressure. The sound signal is non-stationary, i.e., its frequency contents change with time. Moreover, such a sound record is usually combined with the biological noises generated by the heart, respiratory system, and even eye movement. The bottom plot shows a time waveform that was directly recorded from an intracranial aneurysm during surgery. As expected, the time waveform at the bottom of the figure is rather noisy and thereby virtually provides no useful information for the diagnostic. The spectrum of the signal is illustrated to the left of the figure. The frequency spectrum shows the range of resonant frequencies (500 to 620 Hz), but does not give valuable diagnostic information. When the time domain sound wave is converted into the joint time-frequency domain (the middle plot), it can be clearly seen how the power spectrum evolves over time. Researchers have found that it is much easier to identify the existence of the aneurysm from the joint time-frequency domain than from the time or frequency domain alone.

However, computing the Gabor spectrogram usually takes a long time. Therefore, improved methods are desired for more efficiently or more quickly computing the Gabor spectrogram.

Theoretical Background of the Gabor Spectrogram

The Gabor spectrogram is developed from the decomposition of the Wigner-Ville distribution (WVD). For a given signal s(t), the corresponding Gabor expansion is $$s(t) = \sum_{m=-\infty}^{\infty} \sum_{n=-\infty}^{\infty} C_{m,n} h_{m,n}(t) \quad (1)$$

where $C_{m,n}$ are known as the Gabor coefficients. The Gabor expansion maps the time domain signal s(t) into a two-dimensional lattice $C_{m,n}$. The elementary function $h_{m,n}(t)$ is a time- and frequency-shifted Gaussian function, i.e., $$h_{m,n}(t) = g(t-mT)e^{-jn\Omega t} \quad (2)$$

where the normalized Gaussian function g(t) has a form $$g(t) = (\pi\sigma^2)^{-0.25} \exp\left\{-\frac{1}{2\sigma^2}t^2\right\} \quad (3)$$

Taking the Wigner-Ville distribution of both sides of Eq.(1) yields $$WVD_s(t, \omega) = \sum_{m=-\infty}^{\infty} \sum_{m'=-\infty}^{\infty} \sum_{n=-\infty}^{\infty} \sum_{n'=-\infty}^{\infty} C_{m,n} C_{m',n'}^* WVD_{h,h'}(t, \omega) \quad (4)$$

where $WVD_{h,h'}(t,\omega)$, the WVD of the time- and frequency-shifted Gaussian function, which can be referred to as an "energy atom", is concentrated, oscillated, and symmetrical. The energy atom has a closed form, and thus can be pre-calculated and stored in a table. If the Wigner-Ville distribution $WVD_s(t,\omega)$ describes the signal's energy distribution in the joint time-frequency domain, then Eq.(4) shows that the signal energy is a superposition of an infinite number of energy atoms. Note that the energy (average) contained in each individual $WVD_{h,h'}(t,\omega)$ is inversely proportional to the distance between corresponding elementary functions $h_{m,n}(t)$ and $h_{m',n'}(t)$. Based on their contribution to the entire signal energy, Eq.(4) can be re-grouped to obtain the Gabor spectrogram as $$GS_D(t, \omega) = \sum_{|m-m'|+|n-n'|\leq D} C_{m,n} C_{m',n'}^* WVD_{h,h'}(t, \omega) \quad (5)$$

The parameter D denotes the order of the Gabor spectrogram, which characterizes the Manhattan distance between two elementary functions, $h_{m,n}(t)$ and $h_{m',n'}(t)$. The farther the elementary functions, $h_{m,n}(t)$ and $h_{m',n'}(t)$, are from each other, the stronger the energy atom $WVD_{h,h'}(t,\omega)$ oscillates.

For the discrete version, the time and frequency indices of $GS_D(t,\omega)$ in Eq.(5) can be quantized, i.e., $$GS_D[i, k] = \sum_{|m-m'|+|n-n'|\leq D} C_{m,n} C_{m',n'}^* WVD_{h,h'}[i\Delta_t, k\Delta_f] \quad (6)$$

where $\Delta_t$ and $\Delta_f$ denote the time and frequency sampling intervals, respectively. By varying sampling intervals, zoom in and zoom out can be easily performed. This is one of the major advantages of the Gabor spectrogram over other joint time-frequency analysis techniques, such as the STFT and the Wigner-Ville distribution. For the STFT or the WVD, special filters must be applied to zoom in or out. Besides the difficulty of the filter design, the main disadvantage of using filters is that the resulting presentation may not be consistent. For example, the quantity of STFT or WVD at the same time and frequency point could vary at different scales due to the different filters involved.

The current algorithm first computes the Gabor coefficients $C_{m,n}$ and then builds the Gabor spectrogram simply by looking at values in the table. The speed and accuracy of this approach relies heavily on the size of the table (pre-calculated energy atoms). The bigger the table, the greater the accuracy. On the other hand, however, the bigger the table, the more elements of the matrix $GS_D[i,k]$ that need to be updated. In other words, a larger table (more accuracy) requires longer processing time. For the sake of computation speed, the precision of the table of energy atoms is usually limited to be no less than $10^{-3}$, which has been found to be insufficient for many applications.

Therefore, an improved system and method is desired for more efficiently, more quickly, and/or more accurately computing the Gabor spectrogram.

SUMMARY OF THE INVENTION

The present invention provides a signal analyzer, method and memory medium for generating a time varying spectrum for input signals characterized by time-varying frequencies. The invention can also be characterized as a method for analyzing a signal based on the time varying spectrum. The signal analyzer includes a source of a sequence of digital signals representative of an input signal, a processor coupled to the source, and a memory medium coupled to the processor. The memory medium stores a software program which is executable by the processor to compute the time-varying spectrum of the input signal.

When the processor executes the software program, the processor is operable to first compute a Gabor transform (that is, a sampled short-time Founrer transform) of the digital signals to produce Gabor coefficients. The processor then computes an auto-correlation of the Gabor coefficients to produce auto-correlation results. The auto-correlation results are then applied to a 2-dimensional interpolation filter to produce the time-varying spectrum, wherein the time-varying spectrum is a Gabor spectrogram. The signal analyzer may repeat the above steps n+1 times and sum the results for an n order time-varying spectrum. The process may then operate to process and/or display the time-varying spectrum.

In computing the Gabor coefficients of the digital signals, the processor is operable to compute orthogonal-like discrete Gabor transform $C_{m,n}$ in response to the digital signals. The processor computes the Gabor transform of the digital signals by computing:

$$C_{m,n} = \sum_k s[k+mT]\gamma[k]W_{L/\Omega}^{-n[k+mT]} \quad (18)$$

$$= W_N^{-nmT} \sum_{l=0}^{L/N-1} \sum_{k=0}^{N-1} s[lN+k+mT]\gamma[lN+k]W_N^{-nk}$$

$$= W_{N/T}^{-nm} \sum_{l=0}^{L/N-1} \sum_{k=0}^{L-1} R_{l,m}[k]W_N^{-nk}$$

wherein N denotes the number of frequency bins,
wherein L is the length of the filter, which is greater than or equal to N.

In applying the auto-correlation results to the interpolation filter to produce the time-varying spectrum, the processor is operable to compute:

$$y[n] = \sum_{m=0}^{M} x[m]h[(n-n_0)\Delta - mT] \quad (12)$$

where the constants $n_0$, $\Delta$, and T denote time delay, decimation, and interpolation factors. The memory medium may store a table of pre-computed filter response values, and these pre-computed filter response values may be used in applying the auto-correlation results to the interpolation filter to produce the time-varying spectrum. The decimation and interpolation filter described in (12) can be efficiently computed in the frequency domain, i.e., $$Y(\theta) = e^{-in_0\theta} X\left(\frac{T}{\Delta}\theta\right) H\left(\frac{\theta}{\Delta}\right) \quad (13)$$

where $Y(\theta)$ denotes the Fourier transform of $y[n]$.

The previous algorithm of the Gabor spectrogram usually employs a look-up table. The method presented in this patent converts that process into the standard two dimensional multi-rate filter operation. The resulting method is faster and amenable for hardware implementation.

BRIEF DESCRIPTION OF THE DRAWINGS

A better understanding of the present invention can be obtained when the following detailed description of the preferred embodiment is considered in conjunction with the following drawings, in which.

DESCRIPTION OF THE EMBODIMENTS

Incorporation by Reference

The following references are hereby incorporated by reference as though fully and completely set forth herein:

U.S. Pat. No. 5,353,233 to Qian et al titled "Method and Apparatus for Time Varying Spectrum Analysis issued Oct. 4, 1994; and Shie Qian and Dapang Chen, "Joint Time Frequency Analysis" Prentice Hall, 1996.

Figure 2:
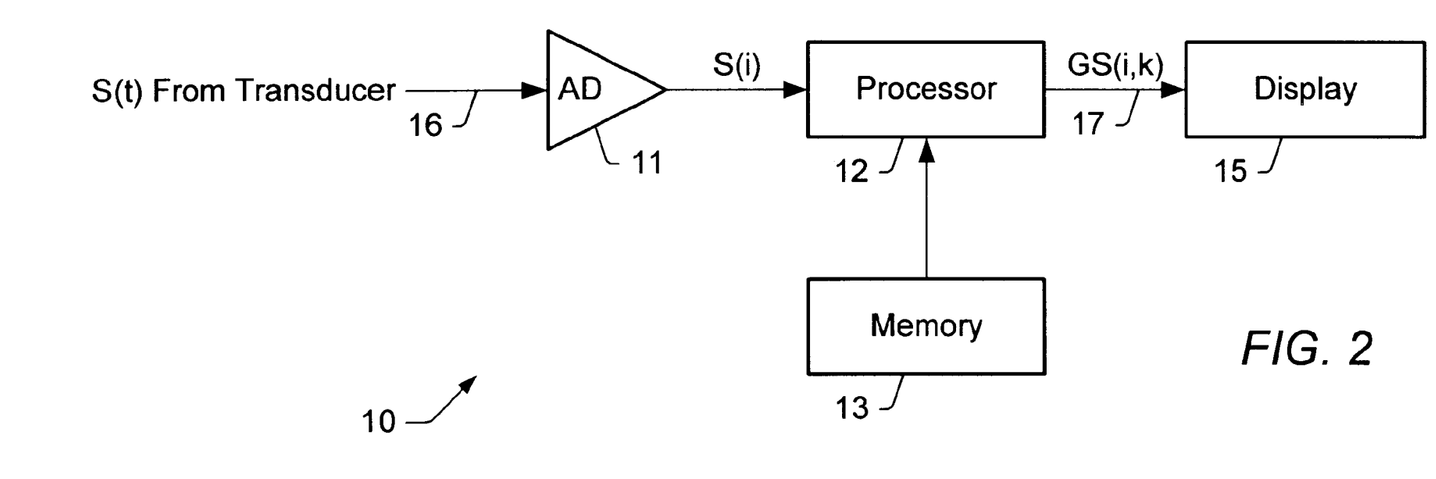
FIG. 2 is a schematic block diagram of a signal analyzer according to the present invention.

FIG. 2—Signal Analyzer

FIG. 2 illustrates a block diagram of a signal analyzer according to one embodiment of the present invention. A signal analyzer using the fast Gabor spectrogram may take any of various forms, and the embodiment of FIG. 2 is exemplary only. For example, the signal analyzer 10 may comprise a general purpose computer or other type of computing device, an add-in card or device which may be coupled to or comprised in a computer, or a stand-alone device.

The analyzer, generally referred to by the reference number 10, may include an analog to digital converter 11, a processor 12, and a memory medium 13 coupled to the processor 12. The analyzer 10 may further include a display system 15 coupled to the processor 12 and/or the memory 13.

An input s(t) may be supplied from a transducer or other source on line 16. The input signal s(t) may comprise acoustic energy, electromagnetic energy, speech, radar signals, sonar signals or other types of signals. The analog to digital converter 11 generates a sequence of digital values s(i) representative of the input signal s(t). The sequence s(i) is supplied to the processor 12. Alternatively, the input sequence s(i) may be directly provided to the processor 12 from a memory, such as memory medium 13, or from a remote computer through a network, e.g., a LAN or the Internet.

The processor 12 may comprise or be implemented by a general purpose processor or CPU, such as an X86 compatible CPU, a digital signal processor (DSP), a microcontroller, a progranmmable device, such as an FPGA (Field Programmable Gate Array), discrete logic, or combinations thereof. The processor 12 may be implemented using a general purpose computer programmed to perform the DSP functions, or a special DSP engine adapted for this purpose. As one example, the processor 12 may comprise the Harris HSP 50214B.

The memory medium 13 may store a software program used by the processor 12 in computing a fast Gabor spectrogram according to the present invention. The memory medium may comprise any of various types of random access memory. The memory medium may comprise a writeable memory or a read-only memory. The term "memory medium" is also intended to include various types of computer memory, such as an installation medium, e.g., a CD-ROM, or floppy disks 104, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer or device in which the programs are executed, or may be located in a second different computer or device which connects to the first computer over a network. In the latter instance, the second computer provides the program instructions to the first computer for execution.

When the signal analyzer 10 is implemented as a computer system, the computer system may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program which is executable to perform the fast Gabor spectrogram according to the present invention. The software program may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A processor, such as the processor 12, executing code and data from the memory medium comprises a means for creating and executing the software program according to the methods or flowcharts described below.

The processor 12 performs a fast Gabor spectrogram according to the present invention. The method of computing the fast Gabor spectrogram is described below. The Gabor spectrogram GS(i,k) is supplied at the output of the processor 12 on line 17.

The processor 12 may further analyze the Gabor spectrogram produced by the processor, i.e., the energy distribution GS(i,k), to generate a graphic representation of the energy distribution for supply to the display 15. Also, the processor 12 may perform other analysis functions, such as partitioning the input signal into components in time for use in speech processing, communications, image recognition, or other purposes.

The memory medium 13, in one preferred embodiment, stores a computer program, such as the listing provided in Appendix A.

The program shown in Appendix A is one example of a source code routine written in the C programming language for performing the Gabor spectrogam according to the present invention. Obviously a wide variety of other source code implementations could be utilized.

Development of the Fast Gabor Spectrogram

A fundamental step to achieve the fast Gabor spectrogram algorithm is to formulate Eq.(6) as a classical linear time-invariant filtering operation. For example, by elementary mathematical manipulations, equation (6) can be converted into $$GS_D[i,k] = \sum_p \sum_{q=1}^{N-1} A_{0,0}[p,q] G_0\left[k\Delta_f - q\frac{\Omega}{2}\right] h_0\left[i\Delta_t - p\frac{T}{2}\right] +$$

$$2Re\left\{\sum_{\beta=1}^{D} \sum_p \sum_{q=1}^{N-1} A_{0,\beta}[p,q] G_\beta\left[\left(k-\beta\frac{\Omega}{2}\right)\Delta_f - q\frac{\Omega}{2}\right] h_0\left[i\Delta_t - p\frac{T}{2}\right] +$$

$$\sum_{\alpha=1}^{D} \sum_{\beta=\alpha-D}^{D-\alpha} \sum_p \sum_{q=1}^{N-1} A_{\alpha,\beta}[p,q] G_\beta\left[\left(k-\beta\frac{\Omega}{2}\right)\Delta_f - q\frac{\Omega}{2}\right] h_\alpha\left[\left(i-\alpha\frac{T}{2}\right)\Delta_t - p\frac{T}{2}\right]\right\}$$

(7)

where $A_{\alpha,\beta}$ denotes two dimensional correlation of the Gabor coefficients, such as $$A_{\alpha,\beta}[p,q] = C_{\frac{p+\alpha}{2},\frac{q+\beta}{2}} C^*_{\frac{p-\alpha}{2},\frac{q-\beta}{2}} \exp\left\{j\beta\Omega\frac{T}{2}p\right\}$$

(8)

and where the lags are determined by the parameters $\alpha$ and $\beta$, respectively $$h_\alpha(t) = \exp\left\{-\frac{1}{\sigma^2}t^2 + j\alpha t\right\}$$

(9)

and $$G_\beta(\omega) = \exp\{-\sigma^2\omega^2 - j\beta\omega\}$$

(10)

For $\alpha = \beta = 0$, $A_{\alpha,\beta}$, $h_\alpha(t)$ and $G_\beta(\omega)$ are all real. In this case, the first term of Eq. (7) is non-negative. So, this term is considered as DC. Accordingly, the second and third terms are oscillated harmonics.

Note that the fundamental operation in Eq.(7) is $$\sum_p \left\{\sum_{q=1}^{N-1} A_{\alpha,\beta}[p,q] G_\beta\left[\left(k-\beta\frac{\Omega}{2}\right)\Delta_f - q\frac{\Omega}{2}\right]\right\}$$

(11)

$$h_\alpha\left[\left(i-\alpha\frac{T}{2}\right)\Delta_t - p\frac{T}{2}\right] = \sum_p B_{\alpha,\beta}[p,k] h_\alpha\left[\left(i-\alpha\frac{T}{2}\right)\Delta_t - p\frac{T}{2}\right]$$

which is a separable two-dimensional multi-rate filter. $h_\alpha(t)$ and $G_\beta(\omega)$ represent the time domain and frequency domain filter coefficients, respectively. Note that each one-dimensional multi-rate filter can be generalized as $$y[n] = \sum_{m=0}^{M} x[m] h[(n-n_0)\Delta - mT]$$

(12)

where the constants $n_0$, $\Delta$, and T denote the time delay, decimation, and interpolation factors. It can be proved that Eq.(12) can be effectively computed by applying the Fourier transform. For example, $$Y(\theta) = e^{-in_0\theta} X\left(\frac{T}{\Delta}\theta\right) H\left(\frac{\theta}{\Delta}\right)$$

(13)

where $Y(\theta)$ denotes the Fourier transform of $y[n]$ in Eq.(12). For $T/\Delta > 1$, $X(T\theta/\Delta)$ is the Fourier transform of the interpolated $x[m]$ ($T/\Delta$ zeros between each pair of samples). $H(\theta/\Delta)$ is the Fourier transform of the decimated window function $h[n]$ (by $\Delta$).

In the Gabor spectrogram of Eq.(7), an energy atom constitutes filter coefficients. Its Fourier transform has a closed form. Thus it is not necessary to compute $H(\theta/\Delta)$ on line or in real time. Rather, this term can be pre-computed and stored in advance. For X-point filter $h[i\Delta_t]$, the corresponding discrete version Fourier transform $H(\omega/\Delta_t)$ is $$H\left[\frac{k}{\Delta_t}\right] = \frac{\sqrt{\pi\sigma^2}}{\Delta_t} \exp$$

(14)

$$\left\{-\frac{\sigma^2}{4}\left(\frac{2\pi}{X}\left(\frac{k-0.5X}{\Delta_t}\right) + \frac{2\pi}{l}\beta\Omega\right)^2 + i\frac{2\pi}{X}\left(\frac{k-0.5X}{\Delta_t}\right)\mu\right\} 0 \le k < X$$

The time shift $\mu$ is given by $$\mu = \frac{l-1}{2},$$

(15)

where l denotes the length of corresponding analysis window function. For Y-point filter $G[k\Delta_f]$, the corresponding discrete version of inverse Fourier transform $g(t/\Delta_\omega)$ is $$g\left[\frac{k}{\Delta_\omega}\right] = \frac{l}{2\pi\Delta_\omega} \sqrt{\frac{\pi}{\sigma^2}}$$

(16)

$$\exp\left\{-\frac{1}{4\sigma^2}\left(\frac{l}{Y}\frac{(k-0.5Y)}{\Delta_\omega} - \alpha T\right)^2 + i\frac{l}{Y}\frac{(k-0.5Y)}{\Delta_\omega}\mu\right\} 0 \le k < Y$$

The frequency shift $\mu$ is given by $$\mu = \frac{2\pi}{l}\frac{(l-1)}{2},$$

(17)

where l denotes the length of the corresponding analysis window function.

Note that the results of (13) are not in the same domains as that of (12). For the equivalent results, corresponding transforms are performed on (13). Because of their linearity, the sum of the inverse Fourier transform (or Fourier transform) is equal to the inverse Fourier transform (or Fourier transform) of the sum. Using this advantage, for the second and third terms in Eq.(7), only one inverse Fourier transform is required to be performed after the summation, rather than computing many inverse Fourier transforms and then computing the sum. Consequently, a considerable amount of inverse Fourier transformations can be saved. The greater the order D, the more the computational saving.

Figure 3A:
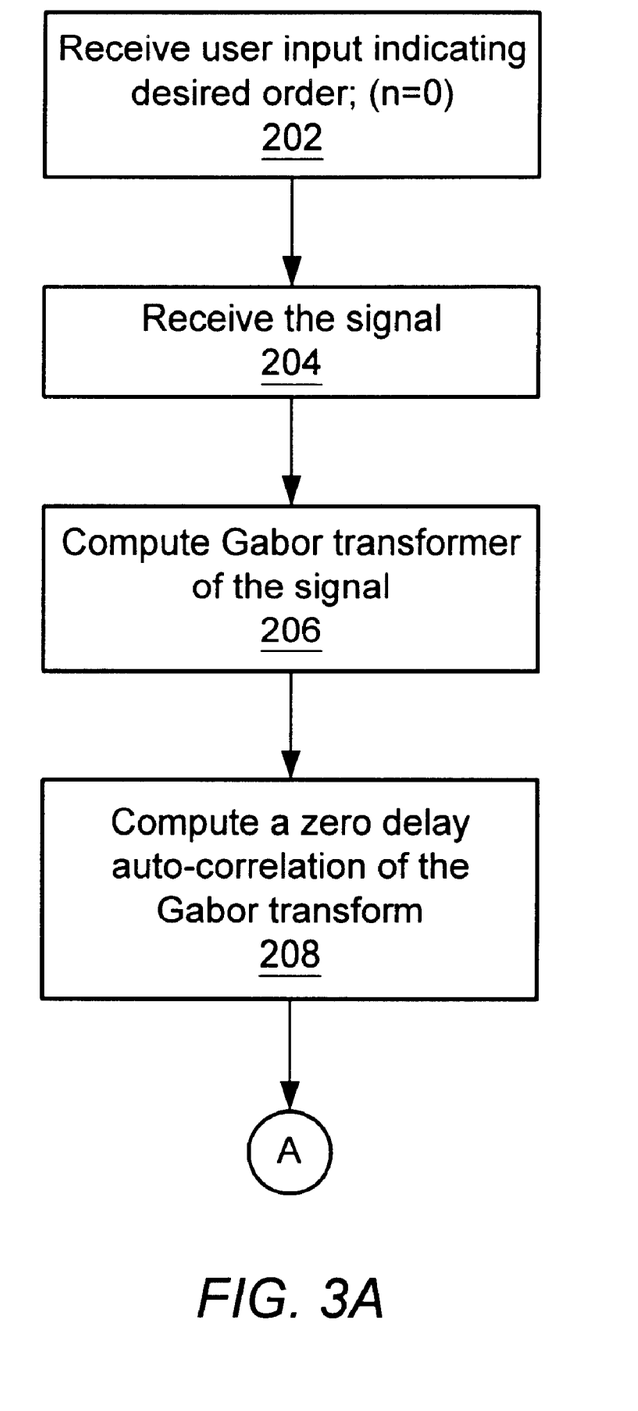
FIGS. 3A and 3B are a flowchart illustrating the method for computing the Gabor spectrogram according to the present invention.
Figure 3B:
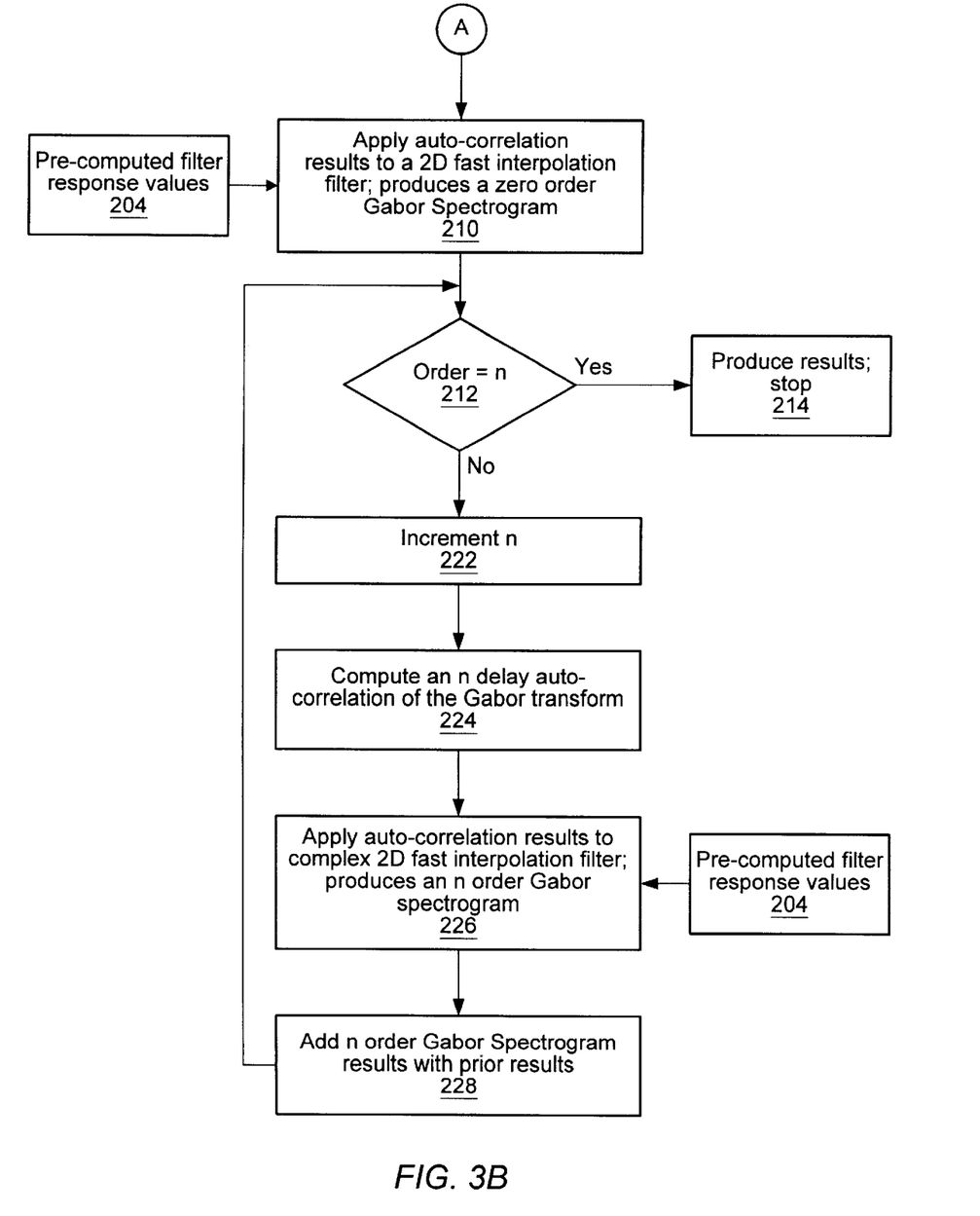
Figure 4:
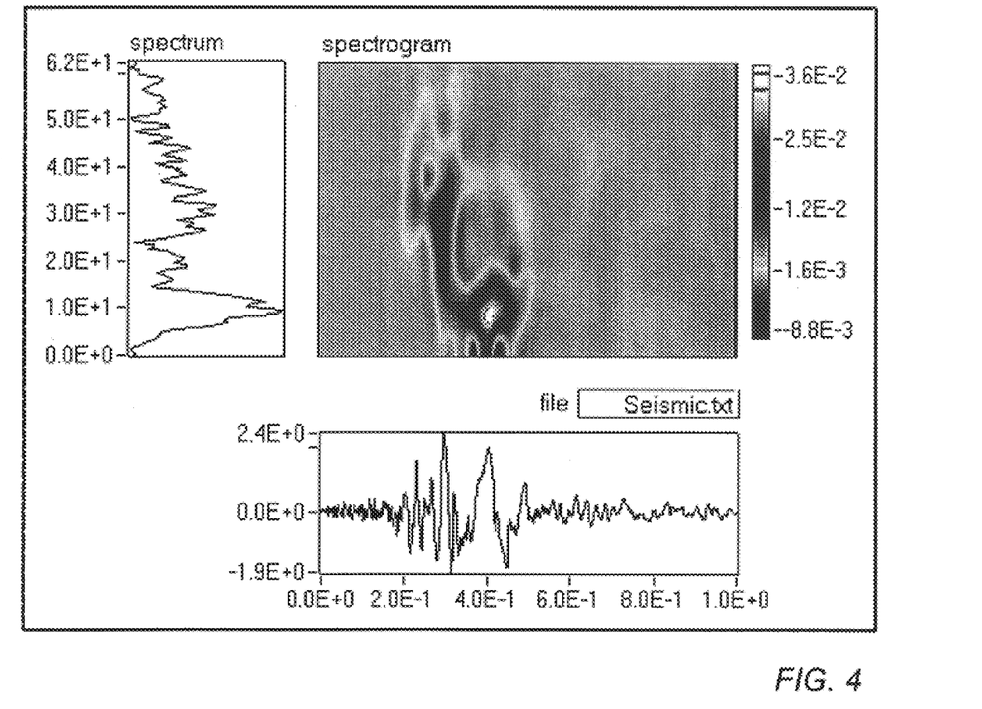
FIG. 4 illustrates time, frequency, and joint time-frequency (Gabor Spectrogram) plots of a seismic signal.

FIG. 3—Flowchart Diagrams

FIG. 3 is a flowchart diagram illustrating a method of computing the fast Gabor spectrogram according to the present invention.

In the preferred embodiment, the method utilizes pre-computed filter response to values, described by (14) and (16), which are generated as the Fourier transform of filter coefficients. These pre-computed filter response values are used during computation of the Gabor spectrogram. These filter response values are pre-computed prior to reception of the signal to reduce the time required in computing the Gabor spectrogram.

As shown, in step 202 the method receives user input indicating a desired order of computation for the Gabor spectrogram. The desired order of the Gabor spectrogram will typically range between order 0 and order 4. A variable, referred to as n, which is used in the method, is initially set to 0.

In step 204 the signal is received. As discussed above, an analog signal s(t) may be received and converted to a digital signal s(i). Alternatively, the digital signal may be received, such as from the computer memory, or from a network or other device. It is noted that the user input in step 202 indicating the desired order of the Gabor spectrogram may be received before or after the signal is received in step 204.

In step 206 the method computes the Gabor coefficients of the signal. For the fast Gabor spectrogram, the Gabor coefficients $C_{m,n}$ are first computed as:

$$C_{m,n} = \sum_{k} s[k+mT]\gamma[k]W_{L/\Omega}^{-n[k+mT]} \quad (18)$$

$$= W_N^{-nmT} \sum_{l=0}^{L/N-1} \sum_{k=0}^{N-1} s[lN+k+mT]\gamma[lN+k]W_N^{-nk}$$

$$= W_{N/T}^{-nm} \sum_{l=0}^{L/N-1} \sum_{k=0}^{L-1} R_{l,m}[k]W_N^{-nk}$$

where N denotes the number of frequency bins and L is the length of the filter, which must be greater than or equal to N. Note that the Gabor coefficients $C_{m,n}$ are nothing more than the sampled short-time Founrer transform. By the conventional approach, such sampled FFT requires the computation of an L-point FFT. In Eq.(19), however, only L/N N-point FFT's are required to be evaluated. While the computation of the conventional method is LlogL, the method presented in Eq.(19) is LlogN. Thus Eq.(19) comprises a fast method of computing the sampled FFT.

In step 208 the method computes, $A_{0,0}$, a zero delay auto-correlation of the Gabor coefficients.

In step 210 the method applies the autocorrelation results from step 208 to a two-dimensional (2-D) fast interpolation filter. This produces a zero order Gabor spectrogram. Steps 208 and 210 operate to compute the first term in Eq. 7 by the fast two-dimensional multi-rate filter described by Eqs. 13–17. Step 210 utilizes the pre-computed filter response values, $H_0$ and $g_0$, stored in a table or data structure, as shown by block 204. As mentioned above, the filter response values comprise pre-computed Fourier transforms of filter coefficients g(t) as shown in Eq.(16).

In step 212 the method determines if the desired order is equal to the variable n. As mentioned above, the order n is initially set to zero. If the user has selected an order 0 Gabor spectrogram, then the Gabor spectrogram has been computed, and in step 214 the method produces the results, preferably by displaying the results, and operation completes. In other words, if the user's desired order equals the current value of n, (n being initially set to 0) as determined in step 212, then in step 214 the results of the Gabor spectrogram are produced and optionally displayed.

However, if the user has selected a higher order Gabor spectrogram computation, such as order 1, 2 or 3, then further computations are performed. If the user has selected a higher order than the current value of n, then in step 222 n is incremented.

In step 224 the method computes an n delay autocorrelation of the Gabor coefficients. The first iteration through the loop comprising steps 212–228 involves computing a one delay autocorrelation of the Gabor coefficients.

After step 224, in step 226 the method applies the autocorrelation results of step 224 to a complex 2-D fast interpolation filter. This produces an n order Gabor spectrogram. Step 226 also utilizes the pre-computed filter response values stored in a table or data structure, as shown by block 204. As mentioned above, the filter response values comprise pre-computed Fourier transforms of filter coefficients g(t) in Eq.(16).

In step 228 the method adds the n order Gabor spectrogram results with the prior results. These prior results include the 0 order Gabor spectrogram results produced in step 210, and any results previously generated in a prior iteration of step 228. In the preferred embodiment, the results are added in the frequency domain, i.e., the Fourier transforms are added together, as discussed above with respect to Eq. 18. In this manner, when the desired order has been computed, only a single inverse Fourier transform is required to be performed on the sum of the Fourier transforms computed in step 228, rather than computing an inverse Fourier transform for each individual term.

In the first pass through the loop comprising steps 212–228, the results generated in step 226 comprise the second term of Eq. 7, and the results generated in step 228 comprises the first and second terms of Eq. 7. After completion of step 228, operation returns to step 212 and the method determines if the order selected by the user is equal to the current value of n. If so, then operation completes and the results are produced in step 214. However, if the user has selected a higher order than the current value of n in step 212, then steps 222–228 are repeated.

Thus, for example, if the user has selected an order 2 Gabor spectrogram, then the 0 order Gabor spectrogram is calculated in step 210, and the first and second order Gabor spectrograms are produced in two iterations of step 228. This essentially computes the first, second and third terms of Eq. 7. In general, if the user has selected an order x, then the number of 1) autocorrelations, and 2) application of these autocorrelation results to a 2-D interpolation filter, are performed x+1 times.

Upon completion of the desired order of the Gabor spectrogram, the results are produced in step 214 and may be displayed on the display.

The present invention thus operates to compute the Gabor spectrogram in a much faster and more efficient manner. This implementation of the Gabor spectrogram is also more accurate than prior Gabor spectrogram techniques.

Therefore, the present invention comprises a system and method for more efficiently, quickly and accurately computing the Gabor spectrogram. The present invention includes a number of novel methods which provide improved efficiency and accuracy, including:

A fast method of computing the sampled FFT Eq.(19);

Conversion of the Gabor spectrogram into classical multi-rate filtering Eq.(7). The multi-rate filter approach not only leads to a fast algorithm of computing the Gabor spectrogram, but also is amenable for hardware implementation. Eq.(7) could be easily realized by off-the-shelf chips, such as an MMX co-processor or any DSP chips;

A fast algorithm for multi-rate filtering Eq.(13);

Pre-calculation of the Fourier transform of the filter coefficients H(θ) in Eq.(14) and g(t) in Eq.(16);

Linearity of the Fourier transform to reduce the number of inverse Fourier transforms described by Eq.(18).

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A signal analyzer, comprising:
 a source of a sequence of digital signals representative of an input signal; and
 a processor coupled to the source for computing a time-varying spectrum of the input signal, wherein the processor is operable to:
  compute a Gabor transform of the digital signals to produce Gabor coefficients;
  compute an auto-correlation of the Gabor coefficients to produce auto-correlation results;
  apply the auto-correlation results to an interpolation filter to produce the time-varying spectrum;
 wherein said time-varying spectrum is used in analyzing said input signal.

2. The signal analyzer of claim 1, wherein the time-varying spectrum is a Gabor spectrogram.

3. The signal analyzer of claim 1, further comprising:
 a memory medium coupled to the processor, wherein the memory medium stores a software program which is executable by the processor to compute the time-varying spectrum, wherein the processor executes the software program in computing the time-varying spectrum.

4. The signal analyzer of claim 1, wherein the interpolation filter is a 2-dimensional interpolation filter.

5. The signal analyzer of claim 1, further comprising:
 a memory medium coupled to the processor which stores a table of pre-computed filter response values;
 wherein said pre-computed filter response values are used in applying the auto-correlation results to the interpolation filter to produce the time-varying spectrum.

6. The signal analyzer of claim 1, wherein the processor is operable to 1) compute the Gabor transform; 2) compute the auto-correlation of the Gabor coefficients; and 3) apply the auto-correlation results; n+1 times for an n order time-varying spectrum.

7. The signal analyzer of claim 1, wherein, in computing the Gabor coefficients of the digital signals, the processor is operable to compute orthogonal-like discrete Gabor transform in response to the digital signals.

8. The signal analyzer of claim 1, wherein, in computing the Gabor transform of the digital signals, the processor is operable to compute:

$$C_{m,n} = \sum_{k} s[k+mT]\gamma[k]W_{L/\Omega}^{-n[k+mT]} \qquad (18)$$

$$= W_N^{-nmT} \sum_{l=0}^{L/N-1} \sum_{k=0}^{N-1} s[lN+k+mT]\gamma[lN+k]W_N^{-nk}$$

$$= W_{N/T}^{-nm} \sum_{l=0}^{L/N-1} \sum_{k=0}^{L-1} R_{l,m}[k]W_N^{-nk}$$

wherein N denotes the number of frequency bins,
wherein L is the length of the filter, which is greater than or equal to N.

9. The signal analyzer of claim 1, wherein, in applying the auto-correlation results, the processor is operable to apply the auto-correlation results to a fast interpolation filter to produce the time-varying spectrum, wherein the processor is operable to compute:

$$Y(\theta) = e^{-in_0\theta}X\left(\frac{T}{\Delta}\theta\right)H\left(\frac{\theta}{\Delta}\right) \qquad (13)$$

where Y(θ) denotes the Fourier transform of y[n], wherein $$y[n] = \sum_{m=0}^{M} x[m]h[(n-n_0)\Delta - mT] \qquad (12)$$

where the constants $n_0$, Δ, and T denote time delay, decimation, and interpolation factors.

10. The signal analyzer of claim 8, further comprising:
 a memory medium coupled to the processor which stores a table of pre-computed filter response values H(θ/Δ);
 wherein said pre-computed filter response values H(θ/Δ) are used in applying the auto-correlation results to the interpolation filter to produce the time-varying spectrum.

11. The signal analyzer of claim 1, further comprising:
 a memory medium coupled to the processor which stores a table of pre-computed values g(t);
 wherein said pre-computed values g(t) are used in applying the auto-correlation results to the interpolation filter to produce the time-varying spectrum.

12. The signal analyzer of claim 1, wherein the processor is operable to compute a sum of inverse Fourier transforms as the inverse Fourier transform of the sum.

13. The signal analyzer of claim 1, wherein the processor is operable to process the time-varying spectrum.

14. The signal analyzer of claim 1, further comprising:
 a display coupled to the processor for displaying a graphic representation of the time-varying spectrum for use in analysis of the input signal.

15. The signal analyzer of claim 1, wherein the source includes an analog to digital converter.

16. A signal analyzer, comprising:
 a source of a sequence of digital signals representative of an input signal; and
 a processor coupled to the source for computing a Gabor spectrogram of the input signal, wherein the processor utilizes multi-rate filtering techniques in computing the Gabor spectrogram;
 wherein the Gabor spectrogram is used in analyzing said input signal.

17. The signal analyzer of claim 16, where the processor is operable to:
   compute a Gabor transform of the digital signals to produce Gabor coefficients;
   compute an auto-correlation of the Gabor coefficients to produce auto-correlation results; and
   apply the auto-correlation results to an interpolation filter to produce the time-varying spectrum.

18. The signal analyzer of claim 17, further comprising:
   a display coupled to the processor for displaying a graphic representation of the time-varying spectrum for use in analysis of the input signal.

19. A method for computing a time-varying spectrum of an input signal, comprising:
   acquiring a sequence of digital signals representative of the input signal;
   computing the time-varying spectrum of energy of the input signal, comprising:
      computing a Gabor transform of the digital signals to produce Gabor coefficients;
      computing an auto-correlation of the Gabor coefficients to produce auto-correlation results;
      applying the auto-correlation results to an interpolation filter to produce the time-varying spectrum;
   wherein said time-varying spectrum is used in analyzing said input signal.

20. The method of claim 19, further comprising:
   analyzing the input signal in response to the time-varying spectrum.

21. A method for computing a time-varying spectrum of an input signal, comprising:
   acquiring a sequence of digital signals representative of the input signal;
   computing a Gabor spectrogram of the input signal, wherein the processor utilizes multi-rate filtering techniques in computing the Gabor spectrogram; and
   analyzing the input signal in response to the time-varying spectrum.

22. The method of claim 21, further comprising:
   generating a graphic representation of the time-varying spectrum.

23. The method of claim 22, wherein the input signal comprises one of: acoustic energy signals; electromagnetic energy signals; speech signal; radar signals; or sonar signals.

24. A memory medium, comprising program instructions for computing a time-varying spectrum of an input signal, wherein the program instructions are executable to:
   receive a sequence of digital signals representative of the input signal;
   compute the time-varying spectrum of energy of the input signal, comprising:
      computing a Gabor transform of the digital signals to produce Gabor coefficients;
      computing an auto-correlation of the Gabor coefficients to produce auto-correlation results;
      applying the auto-correlation results to an interpolation filter to produce the time-varying spectrum;
   wherein said time-varying spectrum is used in analyzing said input signal.

25. The memory medium of claim 24, further comprising program instructions executable to:
   analyze the input signal in response to the time-varying spectrum.

26. The memory medium of claim 24, further comprising program instructions executable to:
   generate a graphic representation of the time-varying spectrum.

27. The memory medium of claim 24, wherein the input signal comprises one of: acoustic energy signals; electromagnetic energy signals; speech signal; radar signals; or sonar signals.

28. A memory medium, wherein the memory medium stores:
   a sequence of digital signals representative of an input signal;
   program instructions for computing a time-varying spectrum of the input signal, wherein the program instructions are executable to:
      compute a Gabor transform of the digital signals to produce Gabor coefficients;
      compute an auto-correlation of the Gabor coefficients to produce auto-correlation results;
      apply the auto-correlation results to an interpolation filter to produce the time-varying spectrum;
   wherein the time-varying spectrum is used in analyzing said input signal.

* * * * *